US007756791B2

(12) United States Patent
Takahashi

(10) Patent No.: US 7,756,791 B2
(45) Date of Patent: Jul. 13, 2010

(54) SLIP PROCESSING APPARATUS AND SLIP PROCESSING SYSTEM

(75) Inventor: Hideyuki Takahashi, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 1165 days.

(21) Appl. No.: 10/449,000

(22) Filed: Jun. 2, 2003

(65) Prior Publication Data

US 2003/0208425 A1    Nov. 6, 2003

(51) Int. Cl.
    *G06Q 40/00*    (2006.01)
(52) U.S. Cl. .................... 705/43; 705/35; 705/44
(58) Field of Classification Search .................. 705/38, 705/35, 40, 39, 36 R, 43, 44
    See application file for complete search history.

(56) References Cited

U.S. PATENT DOCUMENTS

| 5,193,121 | A | * | 3/1993 | Elischer et al. ............. 382/138 |
| 6,047,261 | A | * | 4/2000 | Siefert ........................ 705/11 |
| 6,308,887 | B1 | * | 10/2001 | Korman et al. .............. 235/379 |
| 6,856,965 | B1 | * | 2/2005 | Stinson et al. ................ 705/21 |

FOREIGN PATENT DOCUMENTS

| JP | 4-16817 | 11/1985 |
| JP | SHO 62-57063 | 3/1987 |
| JP | HEI 02-224061 | 9/1990 |
| JP | 4-372084 | 12/1992 |
| JP | HEI 04-362799 | 12/1992 |
| JP | 516765 | 7/1993 |
| JP | 7057043 | 3/1995 |
| JP | HEI 07-085185 | 3/1995 |
| JP | 7-239892 | 9/1995 |
| JP | HEI 8-76965 | 3/1996 |
| JP | HEI 09-062758 | 3/1997 |
| JP | HEI 09-293161 | 11/1997 |
| JP | HEI 10-222725 | 8/1998 |
| JP | HEI 11-259202 | 9/1999 |

OTHER PUBLICATIONS

Personal Financial Assistant Inc. Introduces PictureTel Blenden, Ginger. PR Newswire. New York: Oct. 5, 1992. Sec. 1. p. 1.*
NCR Studies Bank Customers' Reactions to Digital Commerce; [Final Edition] Louis J. Salome Palm Beach Post Staff Writer. Palm Beach Post. West Palm Beach, Fla.: Nov 30, 1996. p. 5.B.*
Say Hello to a 'True' Talking Computer; [Final Edition, C] Paul Galloway. Chicago Tribune (pre-1997 Fulltext). Chicago, Ill.: Dec 18, 1988. p. 1.*
Decision of Rejection (Office Action) in corresponding Patent Application No. JP2002-548641 mailed Jun. 5, 2007.
Japanese Office Action mailed Jul. 7, 2009 in corresponding Japanese Patent Application 2007-18951.

* cited by examiner

*Primary Examiner*—Lalita M Hamilton
(74) *Attorney, Agent, or Firm*—Staas & Halsey LLP

(57) ABSTRACT

A slip image obtaining unit obtains image information on a slip on which character information has been entered. A character recognizing unit recognizes characters entered on the slip on the basis of the image information obtained by the slip image obtaining unit. A determining unit determines whether assistance by an assistant is necessary in an inputting process with the slip according to whether a result of recognition by said character recognizing unit satisfies a predetermined determination condition. An assistance requesting unit requests assistance by the assistant when the determining unit determines that assistance by the assistant is necessary. Whereby, a load on the assistant can be diminished.

16 Claims, 12 Drawing Sheets

FIG. 2

| TYPE OF SLIP | CORRECTION ASSISTANCE CONDITION |
|---|---|
| MONEY TRANSFER TRANSACTION (ADDRESSED TO OWN BANK) | NOT MORE THAN 70% |
| MONEY TRANSFER TRANSACTION (ADDRESSED TO OTHER BANK) | NOT MORE THAN 90% |
| OPENING NEW ACCOUNT | NOT MORE THAN 95% |

| TYPE OF ITEM | CORRECTION ASSISTANCE CONDITION |
|---|---|
| ACCOUNT NUMBER OF TRANSFEREE | NOT MORE THAN 30% |
| NAME OF TRANSFEREE | NOT MORE THAN 90% |
| NAME OF TRANSFEROR | NOT MORE THAN 90% |

| TYPE OF INFORMATION | CORRECTION ASSISTANCE CONDITION |
|---|---|
| AGE | NOT YOUNGER THAN 60 |
| TRANSACTION HISTORY | NO TRANSACTION OVER THE LAST 1 YEAR |
| TREATMENT | VIP TREATMENT OR ABOVE |

| TYPE OF INFORMATION | CORRECTION ASSISTANCE CONDITION |
|---|---|
| TIME | BEFORE 20 O'CLOCK |
| DAY OF THE WEEK | THURSDAY, FRIDAY |
| DATE | THE END OF MONTH (20TH-31ST) |

| TYPE OF SLIP | PRIORITY |
|---|---|
| SLIP UNIT DETERMINATION INFORMATION | PRIORITY D |
| ITEM UNIT DETERMINATION INFORMATION | PRIORITY C |
| CUSTOMER INFORMATION DETERMINATION INFORMATION | PRIORITY B |
| DATE/TIME INFORMATION | PRIORITY A |

22

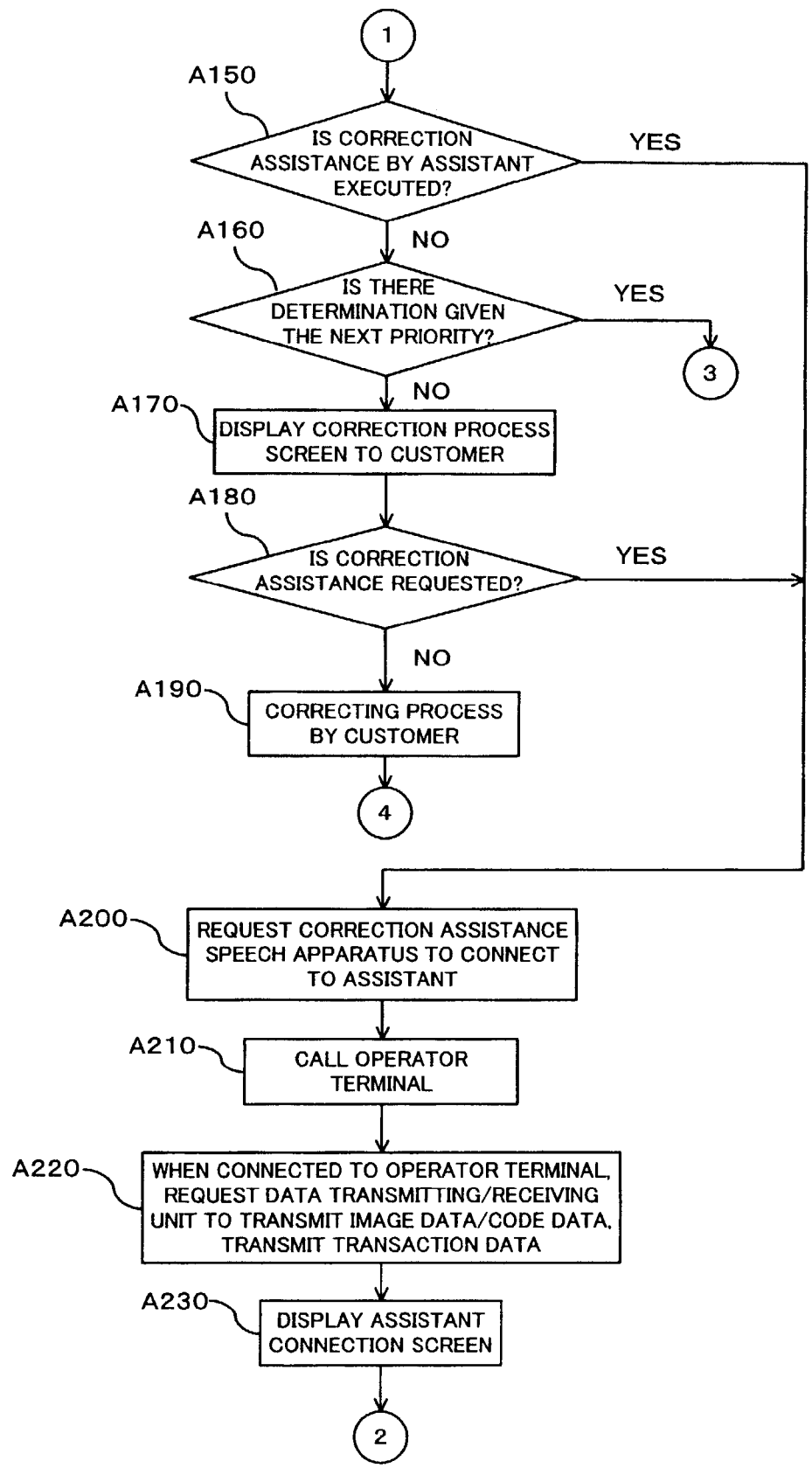

FIG. 14(a)

PLEASE CONFIRM INPUT DATA, AND SELECT AN ITEM WHEN WANTING TO CORRECT IT.

|  | | |
|---|---|---|
| ADDRESSED BANK | FUJITSU BANK<br>[FUJITSU BANK] | BUSINESS DEPARTMENT /MAIN OFFICE<br>[BUSINESS DEPARTMENT /MAIN OFFICE] |
| ACCOUNT NUMBER OF TRANSFEREE | 1234567<br>[1234?67] | |
| NAME OF TRANSFEREE | TARO FUJITSU<br>[TARO KUJITSU] | |
| NAME OF TRANSFEROR | JIRO FUJITSU<br>[JIRO FUJITSU] | |

NEXT, TOUCH ITEM OF "NAME OF TRANSFEREE."

FIG. 14(b)

PLEASE INPUT NAME OF TRANSFEREE WITH KANA SYLLABARY KEYS ON THE SCREEN, PRESS "CONFIRM" KEY

READ DATA: JIRO FUJITSU

NAME OF TRANSFEREE [ — ]

| ア | カ | サ | タ | ナ | ハ | マ | ヤ | ラ | ワ |
| イ | キ | シ | チ | ニ | ヒ | ミ | : | リ | : |
| : | : | : | : | : | : | : | | "CONFIRM" | |

ALTHOUGH OMITTED, DISPLAY ALL JAPANESE KANA SYLLABARY KEYS AND PROMPT THE CUSTOMER TO INPUT.

SLIP PROCESSING APPARATUS AND SLIP PROCESSING SYSTEM

TECHNICAL FIELD

The present invention relates to an automatic transaction apparatus and an automatic transaction system suitable for use in various transaction processes in, for example, a banking institution on the basis of contents of description on a slip made by a customer read out by a scanner.

BACKGROUND ART

In banking institutions, various works which have been done at windows are becoming done by automatic transaction apparatus in these years with promotion of streamlining and labor saving of services.

In an automatic transaction apparatus, a slip entered by a customer is read out by a scanner, and its image data is processed in OCR (Optical Character Recognition) to recognize characters in contents of the description thereon, whereby any one of various transactions is performed on the basis of the contents of the description.

The automatic transaction apparatus may erroneously recognize a character by various causes in the OCR process, thus is required to correct erroneously recognized information.

As a known automatic transaction apparatus, there is known a type that a customer corrects erroneously recognized information using a function of the automatic transaction apparatus. FIGS. 14(a) and 14(b) are diagrams showing examples of display of an input/output unit (touch panel) of the known automatic transaction apparatus. FIG. 14(a) is a diagram showing a result of character recognition compared with image data obtained by a scanner. FIG. 14(b) is a diagram showing an example of display of the touch panel used when the customer corrects the result of recognition.

In the known automatic transaction apparatus, the customer having confirmed erroneous recognition on a display screen of the touch panel shown in FIG. 14(a) corrects erroneously recognized information using its inputting function. When the customer corrects the name of a transferee, for example, the customer inputs a correct name of the transferee using a Japanese kana syllabary keyboard displayed on the touch panel, as shown in FIG. 14(b).

However, a correcting work with a Japanese kana syllabary keyboard displayed on the touch panel is troublesome, thus the correcting work in the automatic transaction apparatus is not necessarily easy for customers. Particularly, correction of a Chinese character is more complicated than an alphanumeric character or a kana character, which is a large burden on aged persons and the like.

There is also known an automatic transaction system, in which a result of recognition on a slip and image data of the slip are transmitted to an operator terminal connected over a communication line, and an assistant assists correction while conversing with a customer over a speech apparatus.

In such the known automatic transaction system, the assistant always converse with a customer irrespective of a result of character recognition on a slip, as above. Even if there is no need for correction or contents of correction are simple so that there is no need for assistant's correction assistance, the assistant is required to converse with the customer, which increases the load on the assistant.

In the light of the above disadvantage, an object of the present invention is to provide an automatic transaction apparatus and an automatic transaction system which can reduce the load on an assistant by requesting assistant's correction assistance when necessary.

DISCLOSURE OF INVENTION

To accomplish the above object, the present invention provides an automatic transaction apparatus comprising a slip image obtaining unit for obtaining image information on a slip on which character information has been entered, a character recognizing unit, communicably connected to the slip image obtaining unit, for recognizing characters entered on the slip on the basis of the image information obtained by the slip image obtaining unit, a determining unit, communicably connected to the character recognizing unit, for determining whether assistance by an assistant is necessary in an inputting process with the slip based on whether or not the result of recognition by the character recognizing unit satisfies a predetermined determination condition, and an assistance requesting unit, communicably connected to the determining unit, for requesting assistance by the assistant when the determining unit determines that assistance by the assistant is necessary.

The predetermined determination condition may be information on a customer, or a type of transaction, or a character recognition rate of the slip. The character recognizing unit may perform character recognition on each of items on the slip, and the predetermined determination condition may be a character recognition rate of a predetermined item of said slip.

The determining unit may determine whether assistance by the assistant is necessary in consideration of date, or determine whether or not assistance by the assistant is necessary in consideration of time.

The determining unit may determine whether or not assistance by the assistant is necessary on the basis of two or more determination conditions among conditions of information on a customer, a type of transaction, a character recognition rate of the slip, a character recognition rate of a predetermined item of the slip, and date and time, and the determining unit may comprise an order setting unit for setting the order in which the two or more determination conditions are to be applied.

The present invention further provides an automatic transaction system comprising an automatic transaction apparatus comprising a slip image obtaining unit for obtaining image information on a slip on which character information has been entered, a character recognizing unit, communicably connected to the slip image obtaining unit, for recognizing characters entered on the slip on the basis of the image information obtained by the slip image obtaining unit, a determining unit, communicably connected to the character recognizing unit, for determining whether assistance by an assistant is necessary in an inputting process with the slip based on whether or not the result of recognition by the character recognizing unit satisfies a predetermined determination condition, an assistance requesting unit, communicably connected to the determining unit, for requesting assistance by the assistant when the determining unit determines that assistance by the assistant is necessary, and an operator terminal comprising an input assisting unit for assisting by the assistant in the inputting process with the slip.

The predetermined determination condition may be information on a customer, or a type of transaction, or a character recognition rate of the slip. The character recognizing unit may perform character recognition on each of items on the slip, and the predetermined determination condition may be a character recognition rate of a predetermined item of the slip.

The determining unit may determine whether assistance by the assistant is necessary in consideration of date, or determine whether assistance by the assistant is necessary in consideration of time.

The determining unit may determine whether or not assistance by the assistant is necessary on the basis of two or more determination conditions among conditions of information on a customer, a type of transaction, a character recognition rate of the slip, a character recognition rate of a predetermined item of the slip, and date and time, and the determining unit may comprise an order setting unit for setting the order in which the two or more determination conditions are to be applied.

The operator terminal may comprise a determination condition changing unit for changing the predetermined determination condition. The automatic transaction system may further comprise a monitoring apparatus for monitoring processes by the automatic transaction apparatus. This monitoring apparatus may comprise a determination condition changing unit for changing the predetermined determination condition.

The automatic transaction system may further comprise a management terminal having information on customers. This management terminal may comprise a determination condition changing unit for changing the predetermined determination condition.

The automatic transaction apparatus and the automatic transaction system according to this invention provide the following effects and advantages:

(1) It is determined whether assistance by an assistant is necessary or not based on whether a result of recognition by the character recognizing unit satisfies a predetermined determination condition or not. When it is determined that assistance by an assistant is necessary, a request for assistance by an assistant is made. Therefore, the assistant does not carry out the process when it is determined that assistance by the assistant is unnecessary. This can avoid an excessive load on the assistant, and realize effective use of the assistant.

(2) It is determined, on the basis of information on a customer, whether assistance by an assistant is necessary in the inputting process with a slip. A customer (at an advanced age, or to be treated as a VIP, for example) who is considered to need assistance can receive assistance by an assistant. This can improve the service to the customers.

(3) It is determined, on the basis of a character recognition rate of a slip, whether assistance by an assistant is necessary in the inputting process with a slip. When the character recognition rate is low, for example, it is determined that assistance by an assistant is necessary. This can improve the accuracy of inputted information, the reliability of the system and the quality of the service to the customers.

(4) It is determined, on the basis of a character recognition rate of an item of a slip, whether assistance by an assistant is necessary in the inputting process with a slip. When correction by a customer is relatively complicated in the inputting process with a slip, for example, it is determined that assistance by an assistant is necessary, which improves the quality of the service to the customers.

(5) It is determined, on the basis of a type of transaction, whether assistance by an assistant is necessary or not in the inputting process with a slip. In the case of a specific type of transaction, assistance by an assistant is requested even when the character recognition rate is relatively high. This can improve the accuracy of inputted information and the reliability of the system.

(6) It is determined, in consideration of date or time, whether assistance by an assistant is necessary or not. At date or time when the office is crowded with customers, for example, assistance by an assistant is automatically requested. This can solve a situation where customers make a long queue in front of the automatic transaction apparatus when the office is crowded, lessen the congestion, and improve the quality of the service to the customers.

(7) It is determined, on the basis of two or more determination conditions among determination conditions of information on a customer, a type of transaction, a character recognition rate of a slip, a character recognition rate of a predetermined item of the slip, and date and time, whether assistance by an assistant is necessary. In addition, the order of priority under which the two or more determination conditions are to be applied is set. Accordingly, the order of priority under which these determination conditions are to be applied is set according to a situation of use of the automatic transaction apparatus, for example. This improves the quality of the service to the customers.

(8) The predetermined determination condition is changed, whereby correction assistance conditions can be arbitrarily changed according to a load on the assistant, a situation of use of the automatic transaction apparatus, etc. This allows efficient use of the assistant.

BRIEF DESCRIPTION OF DRAWINGS

FIG. 2 is a diagram showing an example of slip unit determination information;

FIG. 3 is a diagram showing an example of item unit determination information;

FIG. 4 is a diagram showing an example of customer information determination information;

FIG. 5 is a diagram showing an example of date/time determination information;

FIG. 6 is a diagram showing an example of determination priority information;

FIGS. 9(a) through 9(c) are flowcharts for illustrating processes in the automatic transaction apparatus according to the embodiment of this invention;

FIGS. 14(a) and 14(b) are diagrams showing examples of display of an input/output apparatus of a known automatic transaction apparatus.

BEST MODE FOR CARRYING OUT THE INVENTION

Hereinafter, description will be made of an embodiment of the present invention with reference to the drawings.

Figure 1:
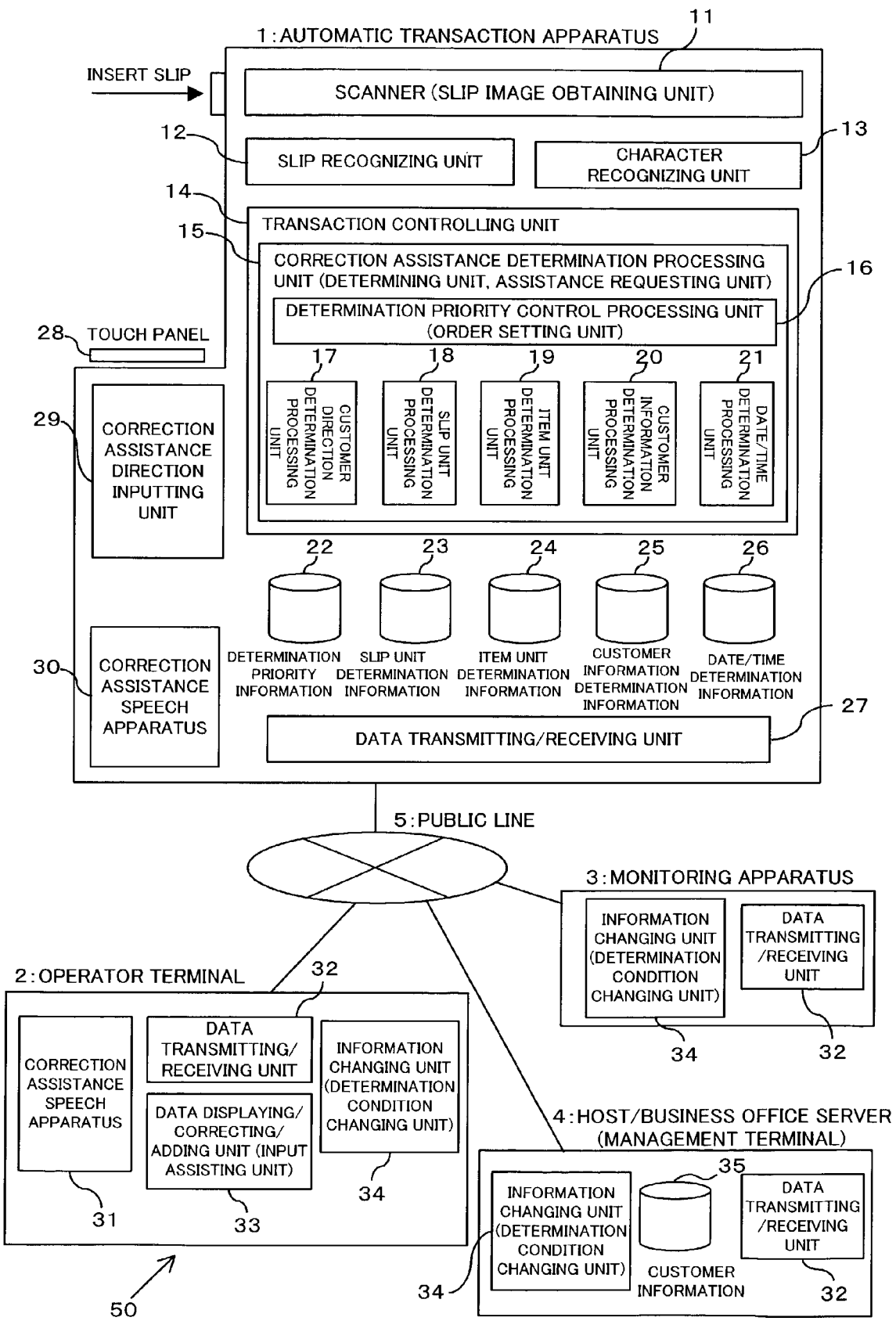
FIG. 1 is a block diagram showing a structure of an automatic transaction system according to an embodiment of this invention.

FIG. 1 is a block diagram showing a structure of an automatic transaction system 50 according to an embodiment of this invention. As shown in FIG. 1, the automatic transaction system 50 comprises an automatic transaction apparatus 1, an operator terminal 2, a monitoring apparatus 3, a HOST/business office server (management apparatus) 4 and a public line 5.

The automatic transaction system 50 is for various transactions in a banking institution such as a bank or the like. At least one automatic transaction apparatus 1 is installed in each office, and customers carry out various transactions such as opening an account, money transfer, deposit and the like. Hereinafter, the description will be made by way of an example where the automatic transaction system 50 is applied to a banking institution.

Meanwhile, only one automatic transaction apparatus 1 is provided in the automatic transaction system 50 in FIG. 1, for the sake of convenience. However, this invention is not limited to this, but, actually a plurality of automatic transaction apparatus 1 are provide in many cases. Similarly, one operator terminal 2, one monitoring apparatus 3 and one HOST/business office server 4 are shown in FIG. 1, but this invention is not limited to this. A plurality of each apparatus may be installed at need.

The automatic transaction apparatus 1 comprises a scanner (slip image obtaining unit) 11, a slip recognizing unit 12, a character recognizing unit 13, a transaction controlling unit 14, a data transmitting/receiving unit 27, a touch panel 28, a correction assistance direction inputting unit 29 and a correction assistance speech apparatus 30, as shown in FIG. 1.

Practically, a function of each of the above units is realized by executing a program stored in a storage unit (hard disk, memory, or the like) not shown provided in the automatic transaction apparatus 1 by a CPU (not shown) In the storage unit of the automatic transaction apparatus 1, there are stored determination priority information 22, slip unit determination information 23, item unit determination information 24, customer information determination information 25 and date/time determination information 26.

The scanner (slip image obtaining unit) 11 obtains image information on a slip (refer to a request form of money transfer C3 in FIG. 10, for example) on which character information has been entered or printed. For example, the slip that has been inserted into the automatic transfer apparatus 1 is read by the scanner 11, whereby image data (image information) of the slip is inputted.

The slip recognizing unit 12 recognizes a type of the slip. For example, the slip recognizing unit 12 recognizes a type of the slip on the basis of image data obtained by the scanner 11.

FIG. 2 is a diagram showing an example of the slip unit determination information 23, depicting an example of a relationship between a type of the slip (type of slip) and a condition (correction assistance condition) under which a request for correction assistance by an assistant should be made. As types of the slip, there are money transfer transaction to own bank, money transfer transaction to other bank, opening of a new account, etc., as shown in FIG. 2, for example.

Recognition of a type of the slip by the slip recognizing unit 12 is done on the basis of image information obtained by the scanner 11. Alternatively, it may be done with a mark for recognition (punched hole, cut-out, identification sign, bar code, etc.) beforehand formed in the slip, for example. Still alternatively, it may be done by inputting the type of the slip from the automatic transaction apparatus 1 when the customer operates the automatic transaction apparatus 1.

The slip recognizing unit 12 transmits a result of the recognition to a correction assistance determination processing unit 15 in the transaction controlling unit 14.

The character recognizing unit 13 recognizes characters entered or printed on the slip on the basis of image data obtained by the scanner 11. In concrete, the character recognizing unit 13 performs an OCR (Optical Character recognition) process on the image information obtained by the scanner 11.

The character recognizing unit 13 calculates a rate of the number of characters that could be recognized to the total number of characters on the slip, which is obtained as a result of the OCR process, as a character recognition rate of the slip. Further, the character recognizing unit 13 calculates a rate of the number of characters that could be recognized to the total number of characters in each of items constituting the slip as a character recognition rate of each item.

Namely, the character recognizing unit 13 performs character recognition on each of items constituting the slip, and calculates a character recognition rate of a predetermined item of the slip.

The following description will be made by way of example where the slip is a form for money transfer to other bank, and has items of "addressed bank," "account number of transferee," "name of transferee," and "name of transferor," as shown in FIG. 14(a).

In the example shown in FIG. 14(a), the total number of characters written on the slip is 31. Seven numeric characters "1, 2, 3, 4, 5, 6 and 7" are written in an item of "account number of transferee," and one character (numeric character "5") could not be recognized among them. Accordingly, the character recognition rate of the slip is about 97%, and the character recognition rate of the item of "account number of transferee" is about 86%.

The character recognizing unit 13 sends the calculated character recognition rates to the correction assistance determination processing unit 15.

The data transmitting/receiving unit 27 enables various data transmitting/receiving communications with each of the operator terminal 2, the monitoring apparatus 3 and the HOST/business office server 4 over the public line 5.

The touch panel 28 is configured with, for example, a liquid crystal touch panel, having a displaying function of displaying a result of input, a message, etc., and an inputting function used by customers to do various inputting processes. The customer can input by touching (pressing) a predetermined portion (button) on the touch panel 28 according to a message displayed on the touch panel 28.

In this embodiment, the touch panel 28 has both the displaying function and the inputting function, as above. However, this invention is not limited to this. There may be separately provided a display for displaying and a keyboard for inputting.

When the customer desires correction assistance by an assistant, the correction assistance direction inputting unit 29 notifies the assistant of it. On the contrary, when the customer does not desire correction assistance, the correction assistance direction inputting unit 29 notifies the assistant of it, as well. The notifying operation by the correction assistance direction inputting unit 29 may be executed by that the customer operates a button displayed on a display screen of the touch panel 28, or a switch (button) or the like provided at a position other than the display screen of the touch panel 28.

The correction assistance speech apparatus 30 is used by the customer to converse with an assistant, which is configured with a receiver having a speaker and a microphone, for example.

The transaction controlling unit 14 controls various transaction processes such as deposit/withdrawal processes such as deposit, withdrawal, money transfer and the like, registration processes, and the like in the automatic transaction apparatus 1. As shown in FIG. 1, the transaction controlling unit 14 has the correction assistance determination processing unit 15 for determining whether correction assistance by an assistant is necessary in an inputting process with a slip.

The correction assistance determination processing unit 15 functions as a determining unit for determining whether assistance by an assistant is necessary in the inputting process with a slip based on whether a result of recognition obtained by the character recognizing unit 13 satisfies a predetermined determination condition. When it is determined that assistance by an assistant is necessary, the correction assistance determination processing unit 15 functions as an assistance requesting unit for requesting the operator terminal 2, using the data transmitting/receiving unit 27 over the public line 5, to give assistance by an assistant.

The correction assistance determination processing unit 15 comprises, as shown in FIG. 1, a determination priority control processing unit (order setting unit) 16, a customer direction determination processing unit 17, a slip unit determination processing unit 18, an item unit determination processing unit 19, a customer information determination processing unit 20 and a date/time determination processing unit 21.

In the automatic transaction apparatus 1, it is possible to beforehand set whether a request for correction assistance by an assistant from a customer is admitted, and whether rejection to correction assistance by an assistant is admitted by a customer. The customer direction determination processing unit 17 determines these settings using, for example, specific flags to determine whether a request for correction assistance by an assistant from a customer is admitted or not, or whether rejection to correction assistance by an assistant is admitted by the customer or not.

Namely, the function of the correction assistance direction inputting unit 29 can be beforehand set valid or invalid, and the customer direction determination processing unit 17 can determine the settings in the automatic transaction apparatus 1.

When the function of the correction assistance direction inputting unit 29 is set invalid, the customer cannot make a request for correction assistance by an assistant in the inputting process with a slip, using the correction assistance direction inputting unit 29.

If the customer direction determination processing unit 17 determines that a request for correction assistance by an assistant in the inputting process with a slip from a customer is admitted, a correction assistance request is made to the operator terminal 2 when the customer makes a request for correction assistance by an assistant using the correction assistance direction inputting unit 29.

Figure 8A:
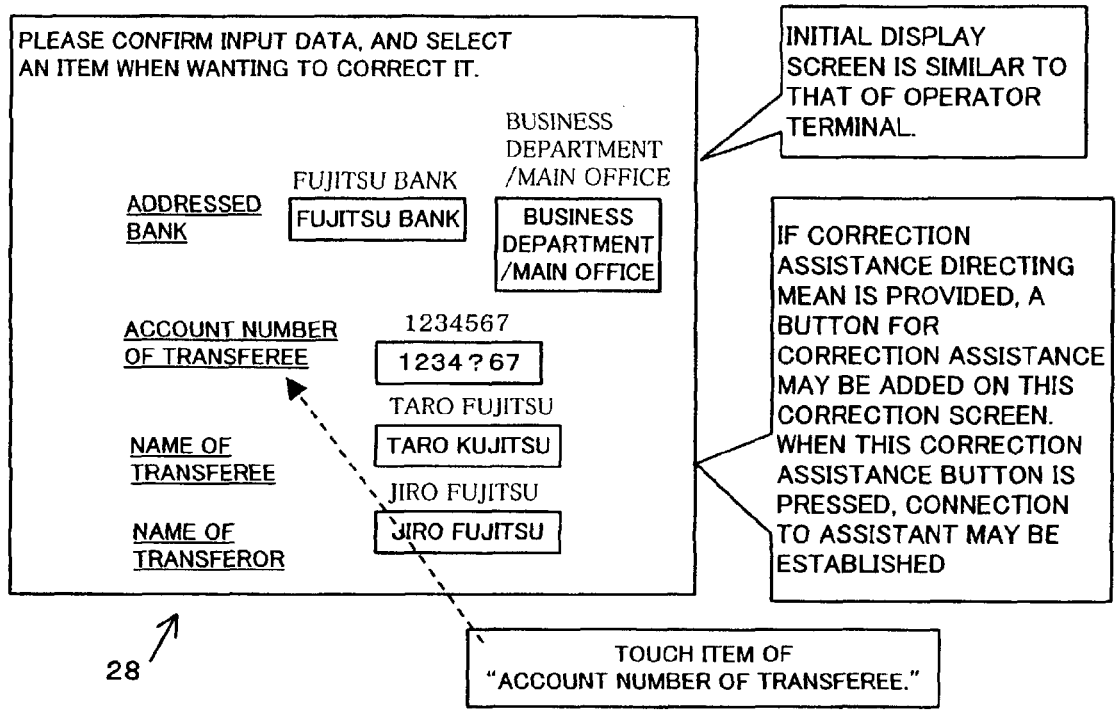
FIGS. 8(a) and (b) are diagrams showing examples of display of a touch panel of an automatic transaction apparatus.
Figure 8B:
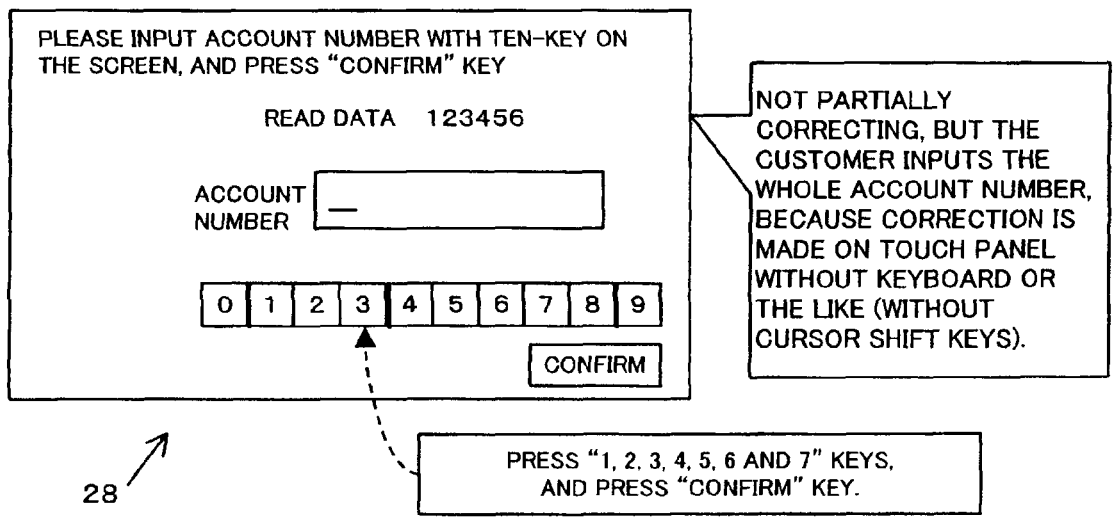

FIGS. 8(a) and 8(b) are diagrams showing examples of display of the touch panel 28 of the automatic transaction apparatus 1. FIG. 8(a) is a diagram showing a result of character recognition in comparison with image data obtained by the scanner. FIG. 8(b) is a diagram showing an example of display of the touch panel 28 when the result of recognition is corrected.

When the character recognizing unit 13 in the automatic transaction apparatus 1 recognizes characters written on a slip on the basis of image data obtained by the scanner 11, image data obtained by the scanner 11 and characters recognized by the character recognizing unit 13 of each item are arranged in two rows and displayed on a display screen of the touch panel 28, whereby they can be compared, as shown in FIG. 8(a).

As shown in FIG. 8 (a), a character that could not be recognized is replaced with "?," and displayed. In the example shown in FIG. 8(a), there is a character that could not be recognized in "account number of transferee", and erroneous recognition occurs in "name of transferee."

When the customer desires to correct "account number of transferee," the customer can correct it to a correct number of transferee with ten-key displayed on the touch panel 28 shown in FIG. 8(b).

In the example shown in FIG. 8(b), the ten-key displayed on the touch panel 28 does not have arrow keys. For this, the customer newly inputs a correct account number and presses a confirmation button, not partially correcting it, thereby to correct it.

On the display screen of the touch panel 28 shown in FIG. 8(a), a button for starting a function of the correction assistance speech apparatus 30 to be described later may be displayed, and the customer may press this button to converse with an assistant.

When the customer corrects a name of transferee, the customer may correct the name of transferee with a Japanese kana syllabary keyboard displayed on the touch panel 28 in the similar manner used in the known automatic transaction apparatus shown in FIGS. 14(a) and 14(b).

The slip unit determination processing unit 18 determines, on the basis of a result of character recognition on a slip unit by the character recognizing unit 13, whether correction assistance by an assistant should be performed or not. The slip unit determination processing unit 18 determines, with reference to a correction assistance condition (refer to FIG. 2) registered in the slip unit determination information 23, whether correction assistance by an assistant should be performed or not.

FIG. 2 is a diagram showing an example of the slip unit determination information 23. In the slip unit determination information 23, each type of slip (type of slip) is related with a condition (correction assistance condition) under which a request for correction assistance by an assistant can be made. The following description will be made by way of example where the slip unit determination processing unit 18 makes determination on the basis of the slip unit determination information 23 shown in FIG. 2.

The slip unit determination processing unit 18 compares a rate of the number of characters that could be recognized in character recognition to the total number of characters on a slip with a predetermined correction assistance condition with respect to a result of character recognition by the character recognizing unit 13 according to a type of the slip recognized by the slip recognizing unit 12.

For instance, when the slip is for a transaction of money transfer addressed to its own bank, the slip unit determination processing unit 18 determines whether a rate (a character recognition rate of the slip) of the number of characters that could be recognized in character recognition to the total number of characters on the slip is not more than 70%, which is a correction assistance condition. When the character recognition rate of the slip is not more than 70%, the correction assistance determination processing unit 15 determines that correction assistance by an assistant should be requested.

Similarly, when the slip is for a transaction of money transfer addressed to other bank, the slip unit determination processing unit 18 determines whether a rate of characters that could be recognized in character recognition to the total number of characters on the slip is not more than 90%, which is a correction assistance condition. When the slip is for opening of a new account, the slip unit determination processing unit 18 determines whether a rate of characters that could be recognized in character recognition to the total number of characters on the slip is not more than 95%, which is a correction assistance condition.

When the character recognition rate of the slip is not more than the correction assistance condition (90%, 95%), the correction assistance determination processing unit 15 determines that correction assistance by an assistant should be requested.

Here, the correction assistance condition (a character recognition rate) for a transaction of money transfer addressed to other bank is set higher than the correction assistance condition (a character recognition rate) for a transaction of money transfer addressed to its own bank. A reason of this is that, in the case of a transaction of money transfer addressed to its own bank, picture image obtained by the scanner 11 is retained in its own company, so that contents of the description of the slip can be recognized when necessary. On the contrary, in the case of a transaction of money transfer addressed to other bank, contents of description of the slip cannot be easily confirmed, so that correction assistance by an assistant is positively performed to improve the accuracy in inputting.

The correction assistance condition (a character recognition rate) for opening of a new account is set high (95%) in order to improve the service to the customers.

The item unit determination processing unit 19 compares a rate of the number of characters that could be recognized in character recognition to the total number of characters in each item with a correction condition assistance condition with respect to a result of character recognition on each of items on a slip by the character recognizing unit 13.

Types of information and correction assistance conditions of the slip unit determination information 23 are beforehand set. Further, the types of information and correction assistance conditions can be arbitrarily set by an information changing unit (determination condition changing unit) 34 provided in each of the operator terminal 2, the monitoring apparatus 3 and the HOST/business office server 4.

The item unit determination processing unit 19 refers to correction assistance conditions (refer to FIG. 3) registered in the item unit determination information 24 to determine whether correction assistance by an assistant should be performed or not.

FIG. 3 is a diagram showing an example of the item unit determination information 24. In the item unit determination information 24, a type of each item (type of slip) is related with a condition under which a request for correction assistance by an assistant (correction assistance condition) should be made. The following description will be made by way of an example where the item unit determination processing unit 19 determines on the basis of the item unit determination information 24 shown in FIG. 3.

The item unit determination processing unit 19 determines whether a rate (a character recognition rate of in a predetermined item) of the number of characters that could be recognized in character recognition to the total number of characters written in an item of "account number of transferee" is not more than 30%, which is a correction assistance condition. When the character recognition rate of the item is not more than 30%, the correction assistance determination processing unit 15 determines that correction assistance by an assistant should be requested.

Similarly, the item unit determination processing unit 19 determines whether a rate of the number of characters that could be recognized in character recognition to the total number of characters written in an item of "name of transferee," or a rate of the number of characters that could be recognized in character recognition to the total number of characters written in an item of "name of transferor" is not more than 90%, which is a correction assistance condition. When the character recognition rate of each of the items is not more than 90%, the correction assistance determination processing unit 15 determines that correction assistance by an assistant should be requested.

Here, the correction assistance condition (character recognition rate) for an item of "account number of transferee" is set lower than the correction assistance condition (a character recognition rate) for an item of "name of transferee" or "name of transferor." A reason of this is that an account number of transferee basically consists of only numeric characters, so that a correcting work for it is easier than an inputting work of a name of transferee or a name of transferor. Hence, the correcting work is considered to be not a large burden on the customer.

Types of information and correction assistance conditions of the item unit determination information 24 are beforehand set. Further, the types of information and the correction assistance conditions can be arbitrarily set by the information changing unit 34 provided in each of the operator terminal 2, the monitoring apparatus 3 and the HOST/business office server 4.

The customer information determination processing unit 20 determines, on the basis of information on a customer, whether correction assistance by an assistant should be performed or not. The customer information determination processing unit 20 specifies a customer on the basis of various kinds of information (account number, telephone number and the like) inputted from the touch panel by the customer, information registered on a cash card inserted by the customer, information (customer's name, account number) recognized by the character recognizing unit 13 and the like.

The customer information determination processing unit 20 refers to correction assistance conditions (refer to FIG. 4) registered in the customer information determination information 25 to determine whether correction assistance by an assistant should be performed or not.

FIG. 4 is a diagram showing an example of the customer information determination information 25. In the customer information determination information 25, a type of information (type of information) on a customer is related with a condition (correction assistance condition) under which a request for correction assistance by an assistant should be made. The following description will be made by way of example where the customer information determination processing unit 20 determines on the basis of the customer information determination information 25 shown in FIG. 4.

The customer information determination processing unit 20 refers to the customer information 35 in the HOST/business office server 4 to obtain information on "age," "transaction history," and "treatment" on the customer specified as above.

The customer information determination processing unit 20 compares obtained information on the customer with the customer information determination information 25. When the information satisfies any one of conditions of "not younger than 60," "no transaction history over the last one year," and "VIP treatment or above," the customer information determination processing unit 20 determines that correction assistance determination processing unit 15 should request the correction assistance irrespective of determination by the above slip unit determination processing unit 18 and item unit determination processing unit 19.

A reason why correction assistance by an assistant should be requested when age of the customer is not younger than 60 is to improve the service to aged persons. A reason why correction assistance by an assistant should be performed when the customer makes no transaction over the last one year or the customer is treated as a VIP is to improve the service to such customers. This is considered to improve the degree of satisfaction of the customers.

Types of information and the correction assistance conditions of the customer information determination information 25 are beforehand set. Further, the types of information and the correction assistance conditions can be arbitrarily set by the information changing unit 34 provided in each of the operator terminal 2, the monitoring apparatus 3 and the HOST/business office server 4.

The date/time determination processing unit 21 determines, on the basis of date, time or the like when a customer performs an inputting process, whether correction assistance by an assistant should be requested or not. The data/time determination processing unit 21 specifies date, time, a day of the week and the like on the basis of a clock (not shown) or a calendar (not shown) provided in, for example, the automatic transaction apparatus 1.

The date/time determination processing unit 21 refers to correction assistance conditions (refer to FIG. 5) registered in the date/time determination information 26 to determine whether correction assistance by an assistant should be requested or not.

FIG. 5 is a diagram showing an example of the date/time determination information 26. In the date/time determination information 26, date, a day of the week and time (types of information) are related with respective conditions (correction assistance conditions) under which a request for correction assistance by an assistant should be made. The following description will be made by way of example where the date/time determination processing unit 21 determines on the basis of the date/time determination information 26 shown in FIG. 5.

The date/time determination processing unit 21 refers to a clock and a calendar of the automatic transaction apparatus 1 to obtain time, date and a day of the week when the transaction is performed, and compares them with the date/time determination information 26. When any one of conditions that "the time is before 20 o'clock," "the day of the week is Thursday or Friday," and "the date is from 20th to 31st," is satisfied, the correction assistance determination processing unit 15 determines that correction assistance by an assistant should be requested irrespective of determinations by the above slip unit determination processing unit 18, item unit determination processing unit 19 and customer information determination processing unit 20.

A reason why correction assistance by an assistant should be requested when any one of these conditions is satisfied is that a rate of use of the automatic transaction apparatus in a banking institution becomes high and the banking institution is crowded in any one of these cases that "the time is before 20 o'clock," "the date of the week is Thursday or Friday," and "the date is from 20th to 31st." In such case, it is considered that correction assistance by an assistant is necessary to quicken the processing.

The types of information and the correction assistance conditions of the date/time determination information 26 are beforehand set. Further, the type of information and the correction assistance conditions can be arbitrarily set by the information changing unit 34 provided in each of the operator terminal 2, the monitoring unit 3 and the HOST/business office server 4.

The determination priority control processing unit (order setting unit) 16 gives priority to determination made by any one of the slip unit determination processing unit 18, the item unit determination processing unit 19, the customer information determination processing unit 20 and the date/time determination processing unit 21 to set as to whether assistance by an assistant is necessary in the inputting process with a slip. The determination priority control processing unit 16 sets the order of priority of application of determinations made by the slip unit determination processing unit 18, the item unit determination processing unit 19, the customer information determination processing unit 20 and the date/time determination processing unit 21.

Namely, the determination priority control processing unit 16 functions as an order setting unit for setting the order of priority of application of conditions of determination on the basis of information on a customer, a type of transaction, a character recognition rate of a slip, a character recognition rate of a predetermined item of the slip, and date (a day of the week) and time.

The determination priority control processing unit 16 registers the order of priority as priority in the determination priority information 22 (refer to FIG. 6).

FIG. 6 is a diagram showing an example of the determination priority information 22. In the determination priority information 22, the order in which the slip unit determination information 23, the item unit determination information 24, the customer information determination information 20 and the date/time determination information 26 should be applied according to an order of priority A, B, C or D. In concrete, the priority is given A, B, C and D in the descending order.

In the determination priority information 22 shown in FIG. 6, the order of priority is set so that the date/time determination information 22, the customer information determination information 25, the item unit determination information 24 and the slip unit determination information 23 should be applied in order.

The order of priority in the determination priority control processing unit 16 is beforehand set. Further, the order of priority can be arbitrarily set by the information changing unit 34 provided in each of the operator terminal 2, the monitoring apparatus 3 and the HOST/business office server 4.

The correction assistance determination processing unit 15 determines whether assistance by an assistant is required in the inputting process with a slip according to the priority set in the determination priority information 22.

The public line 5 is a communication line such as the Internet, a private line or the like. The public line 5 communicably connects the automatic transaction apparatus 1, the operator terminal 2, the monitoring apparatus 3 and the HOST/business office server 4 to one another. The public line 5 is desirably configured with a private line or a point-to-point system in order to prevent leakage of information on customers and the like to the outside.

The operator terminal 2 is used for various processes by an assistant, which comprises a correction assistance speech apparatus 31, a data transmitting/receiving unit 32, a data displaying/correcting/adding unit (input assisting unit) 33 and the information changing unit (determination condition changing unit) 34.

The correction assistance speech apparatus 31 is configured with a receiver having a speaker and a microphone, for example, like the correction assistance speech apparatus 30 provided in the automatic transaction apparatus 1. The assistant can converse with a customer at the automatic transaction apparatus 1 with the correction assistance speech apparatus 31.

The data transmitting/receiving unit 32 is used to communicate with the automatic transaction apparatus 1, the monitoring apparatus 3, and the HOST/business office server 4.

Figure 7:
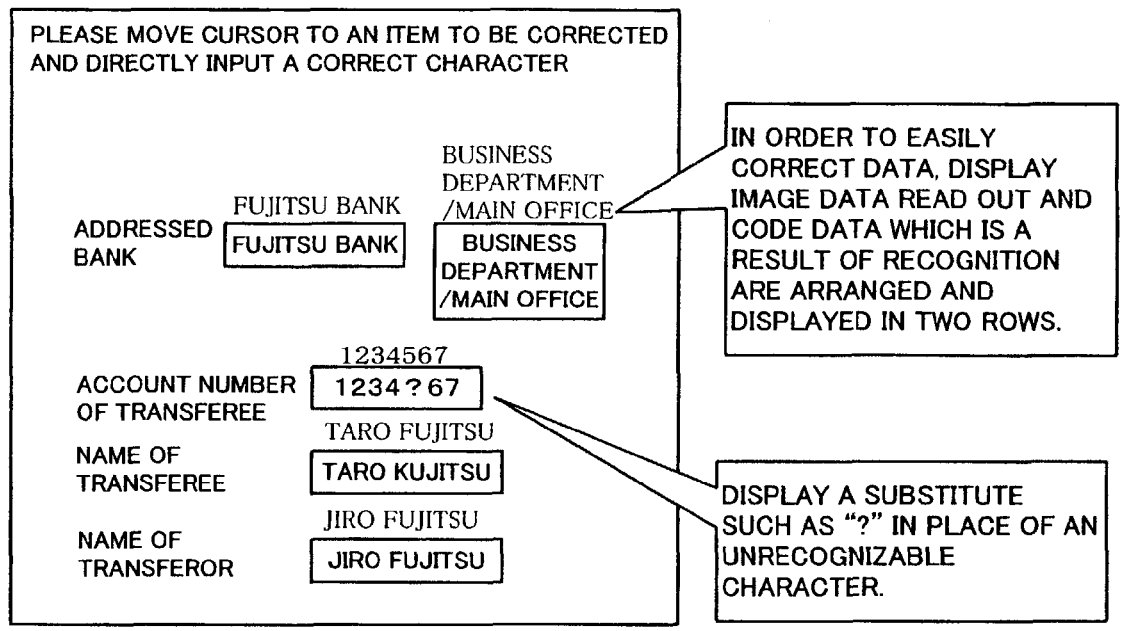
FIG. 7 is a diagram showing an example of display of a display unit of an operator terminal.

The data displaying/correcting/adding unit 33 displays image data or transaction data transmitted from the automatic transaction apparatus 1 on a display unit (not shown) of the operator terminal 2, as shown in FIG. 7, whereby the assistant can correct the transaction data. The data displaying/correcting/adding unit 33 is realized by executing a program stored in a storage unit (not shown) of the operator terminal 2 by a CPU (not shown) for example.

FIG. 7 is a diagram showing an example of display of the display unit of the operator terminal 2. As shown in FIG. 7, the data displaying/correcting/adding unit 33 displays image data and transaction data transmitted from the automatic transaction apparatus 1 in comparison with each other.

For instance, in FIG. 7, image data obtained by the scanner 11 of the automatic transaction apparatus 1 and a result of recognition obtained by the character recognizing unit 13 of each of the items constituting a slip are arranged and displayed in two rows, whereby the assistant can readily find erroneous recognition. A character that could not be recognized is replaced with "?," and displayed. In the example shown in FIG. 7, there is a character in an account number of transferee which could not be recognized, and erroneous recognition occurs in the name of transferee.

The assistant can correct the transaction data (recognition result) or add new information while referring to the display unit of the operator terminal 2. Namely, the data display/correcting/adding unit 33 functions as an input assisting unit for assisting the inputting process with a slip by the assistant.

The information changing unit 34 changes contents of the determination priority information 22, the slip unit determination information 23, the item unit determination information 24, the customer information determination information 25 and the date/time determination information 26 of the automatic transaction apparatus 1. The assistant can arbitrarily change the determination priority information 22, the slip unit determination information 23, the item unit determination information 24, the customer information determination information 25 and the date/time determination information 26 with the information changing unit 34. Namely, the information changing unit 34 functions as a determination condition changing unit for changing predetermined determination conditions.

The monitoring apparatus 3 monitors various processes in the automatic transaction system 50, monitoring processes performed by the automatic transaction apparatus 1. The monitoring apparatus 3 comprises the information changing unit (determination condition changing unit) 34 and a data transmitting/receiving unit 32. The information changing unit 34 and the data transmitting/receiving unit 32 have almost the same functions as the above-described information changing unit 34 and data transmitting/receiving unit 32 of the operator terminal 2, descriptions of which are thus omitted.

The HOST/business office server (management terminal) 4 is installed in a business office, a regional center or the like, which is a management terminal having information on customers. As shown in FIG. 1, the HOST/business office server 4 comprises an information changing unit (determination condition changing unit) 34, a data transmitting/receiving unit 32, and retains customer information 35 in a storage unit not shown.

The customer information 35 is a database configured by registering various kinds of information (name, account number, address, telephone number, age, treatment, transaction history, etc.) on each customer. Information of age, treatment, transaction history, etc. can be referred with a customer name, an account number or the like from the customer information determination processing unit 20 of the automatic transaction apparatus 1 or the operator terminal 2.

The information changing unit 34 and the data transmitting/receiving unit 32 have almost the same functions as the above-described information changing unit 34 and data transmitting/receiving unit 32 of the operator terminal 2, descriptions of which are thus omitted.

Figure 9A:
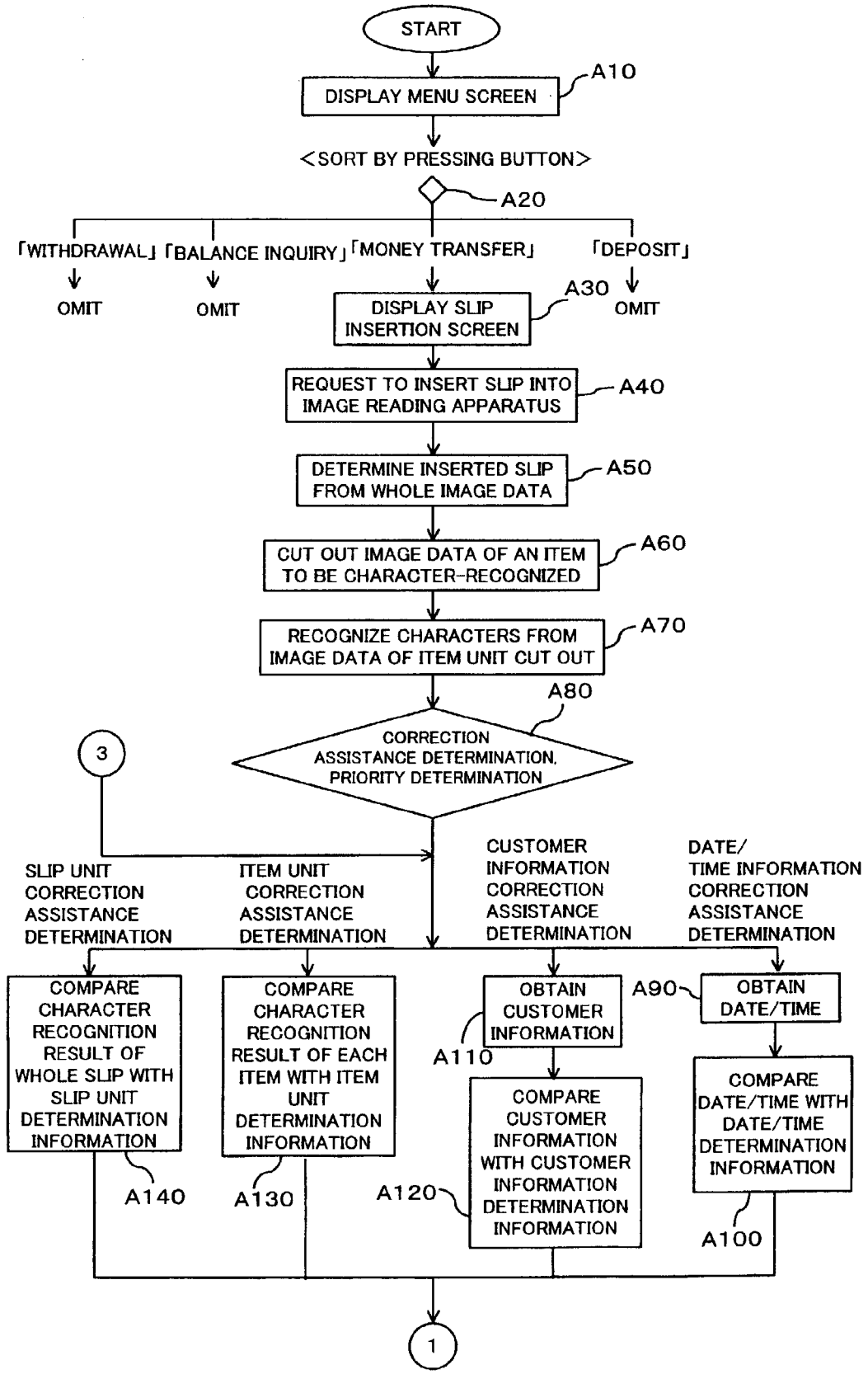
Figure 9C:
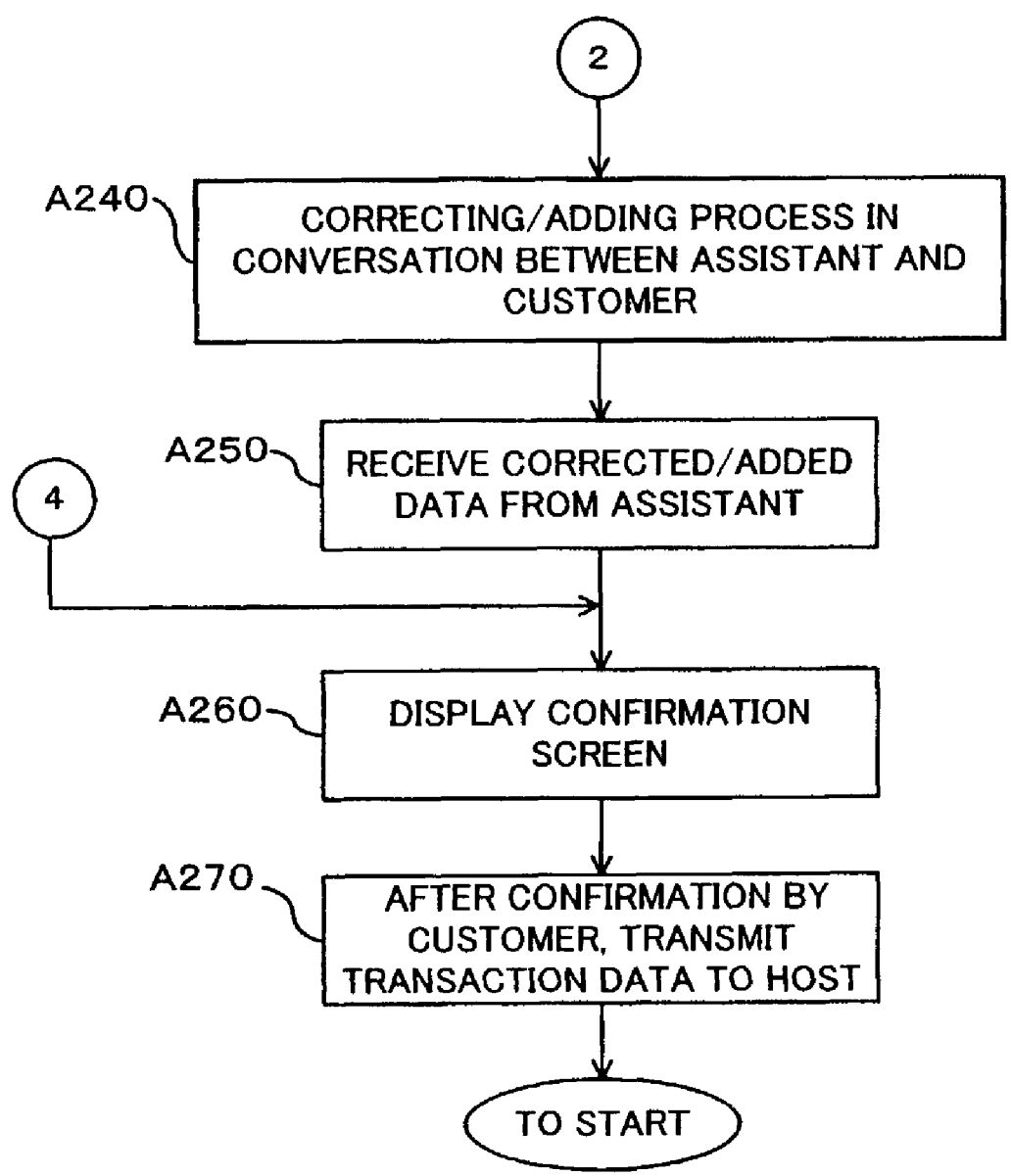

With the above structure, processes in the automatic transaction apparatus 1 according to the embodiment of this invention will be described with reference to FIGS. 10 through 13 in accordance with flowcharts (in accordance with steps A10 through A270) shown in FIGS. 9(a) through 9(c), taking a transaction of money transfer based on a transfer slip as an example.

Figure 10:
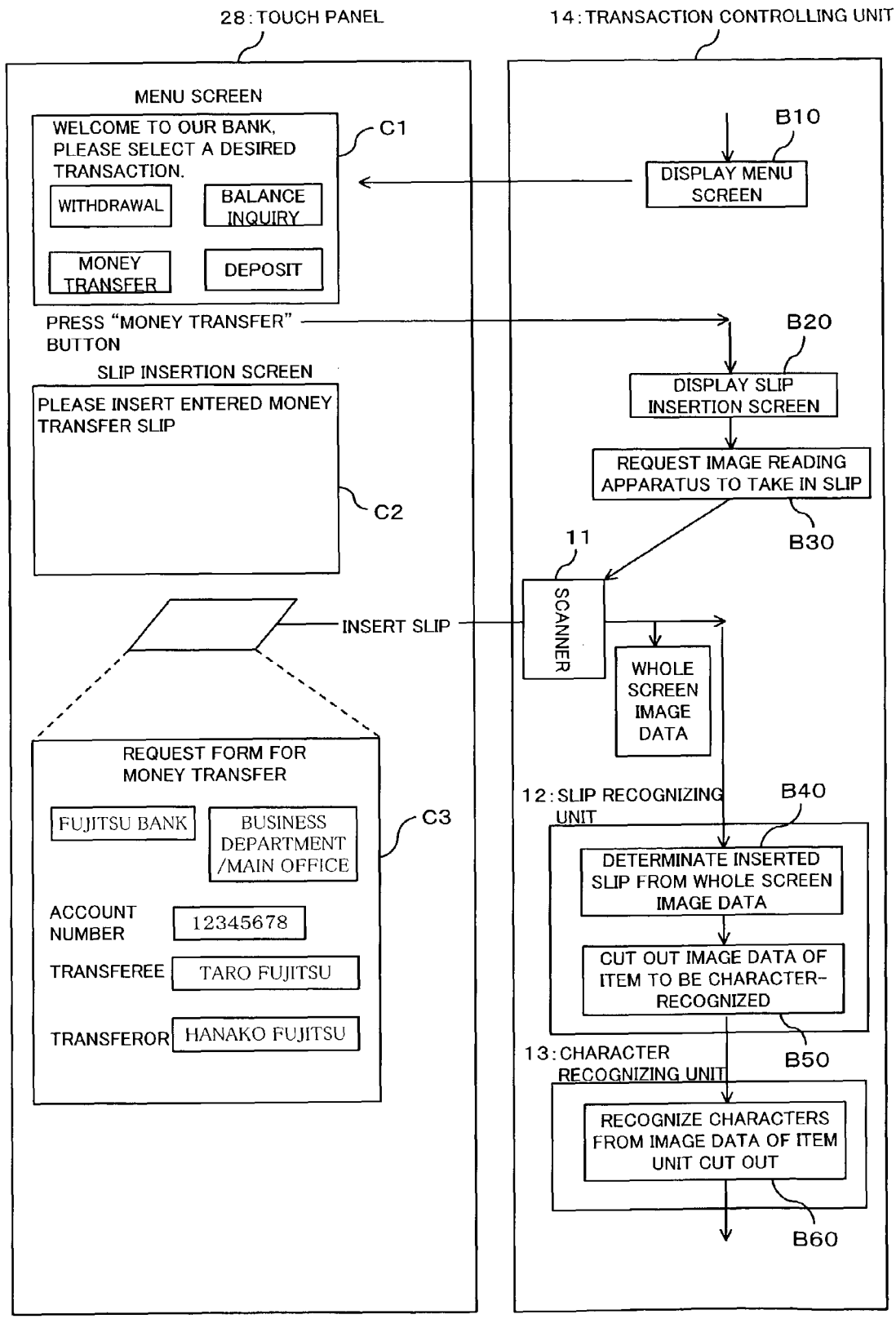
FIG. 10 is a diagram showing a flow of a process in the automatic transaction apparatus according to the embodiment of this invention together with an example of display of the touch panel and an example of slip.
Figure 11:
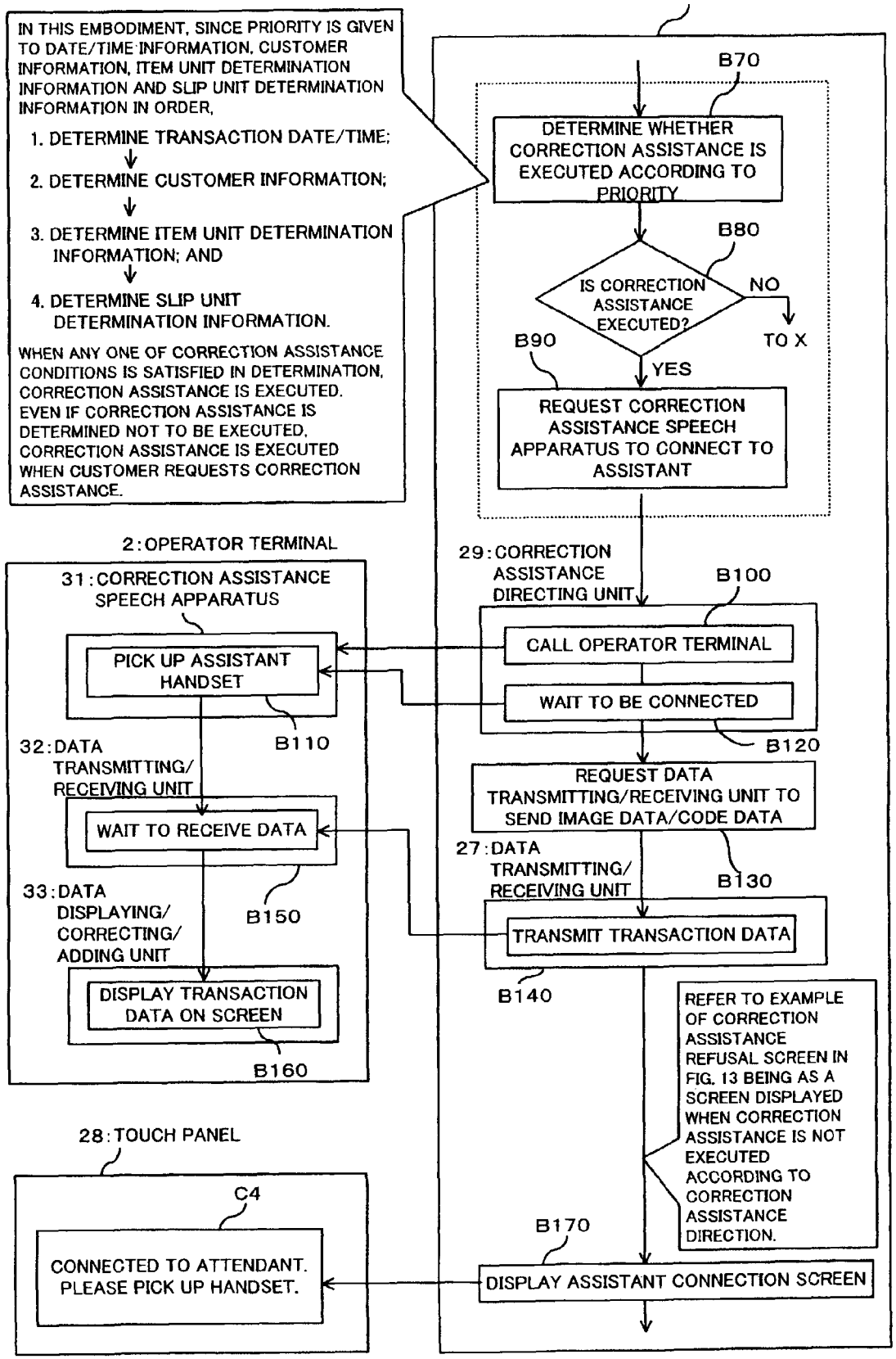
FIG. 11 is a diagram showing a flow of a process in the automatic transaction apparatus and a flow of a process in the operator terminal according to the embodiment of this invention together with an example of display of the touch panel.
Figure 12:
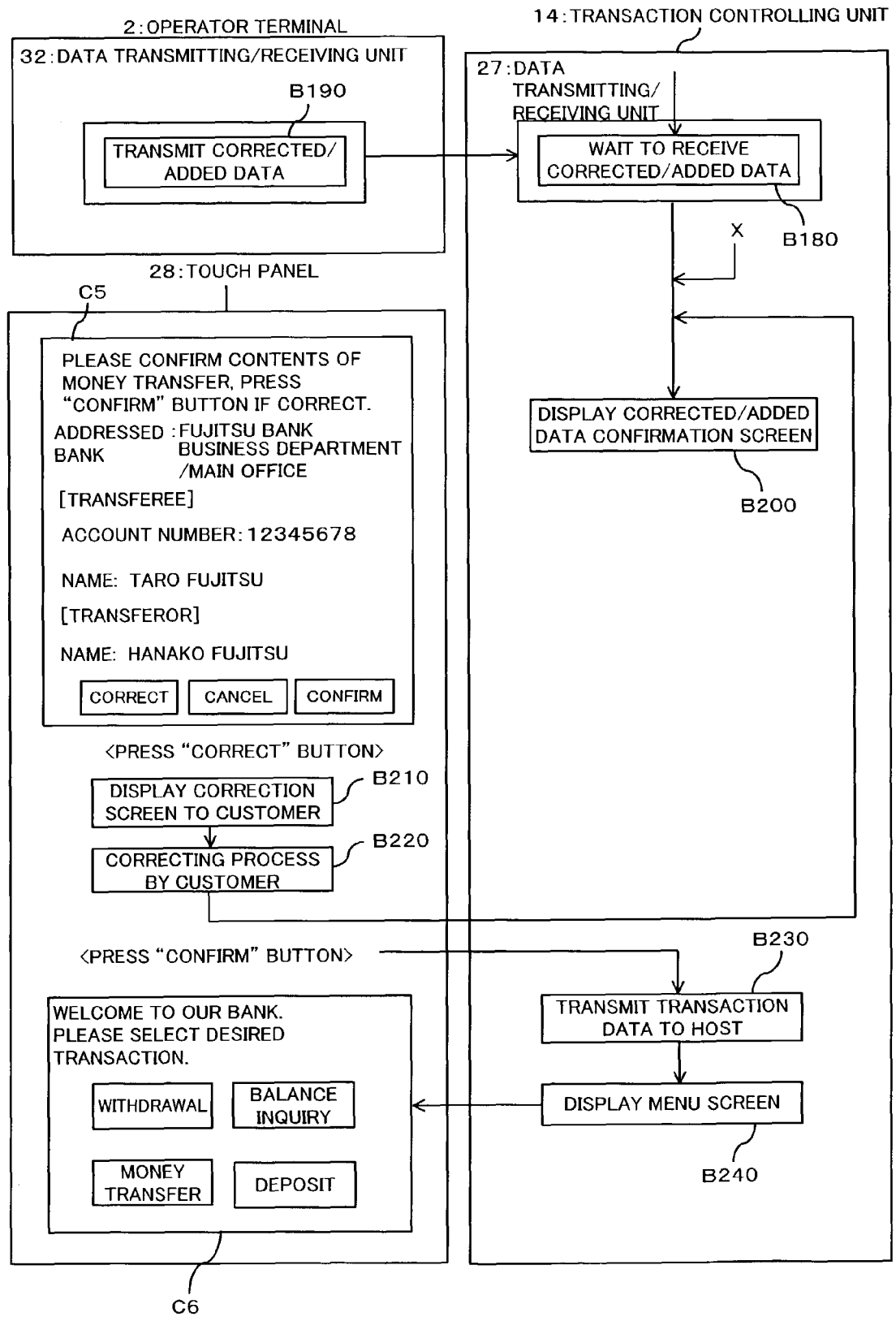
FIG. 12 is a diagram showing a flow of a process in the automatic transaction apparatus and a flow of a process in the operator terminal according to the embodiment of this invention together with an example of display of the touch panel.
Figure 13:
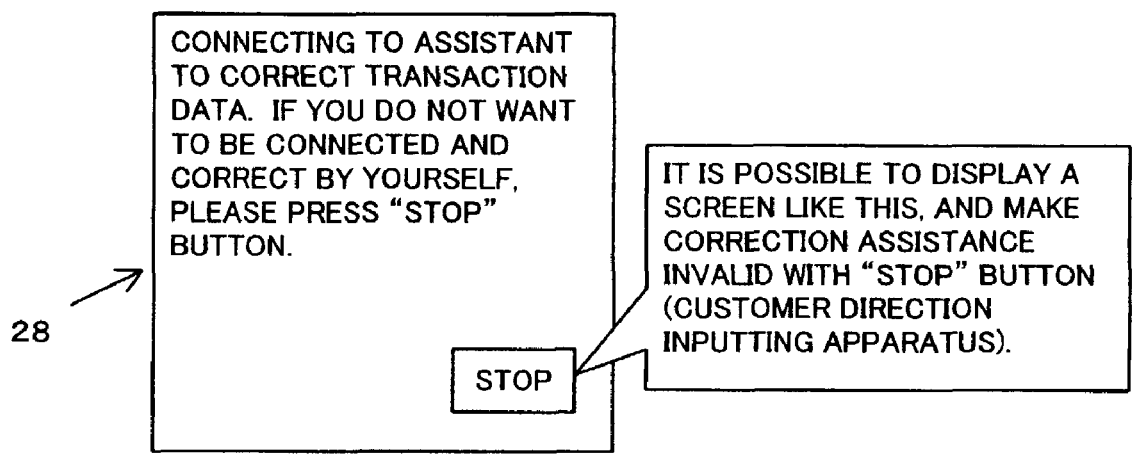
FIG. 13 is a diagram showing an example of display of the touch panel.

FIG. 10 is a diagram (steps B10 through B60) showing a flow of a process in the automatic transaction apparatus 1 together with an example of display (display screens C1 and C2) of the touch panel 28 and an example of slip (transfer request C3). FIG. 11 is a diagram (steps B70 through B170) showing a flow of a process in the automatic transaction apparatus 1 and a flow of a process in the operator terminal 2 together with an example of display (display screen C4) of the touch panel 28. FIG. 12 is a diagram (steps B180 through B240) showing a flow of a process in the automatic transaction apparatus 1 and a flow of a process in the operator terminal 2 together with an example of display (display screens C5 and C6) of the touch panel 28. FIG. 13 is a diagram showing an example of display of the touch panel 28.

The transaction controlling unit 14 displays a menu to prompt a customer to select any one of transactions of "withdrawal," "balance inquiry," "money transfer," and "deposit" as shown on a display screen C1 in FIG. 10 of the touch panel 28 (step A10, B10), and waits for an input from the touch panel 28 (step A20).

The transaction controlling unit 14 handles a transaction according to selection on the touch panel 28 by the customer. The following description will be made by way of example where the customer selects a button of "money transfer" on the touch panel 28.

When the customer presses a button of "money transfer" on the touch panel 28 (refer to a route of "money transfer" at step A20), the transaction controlling unit 14 displays a screen for requesting the customer to insert a slip on which predetermined items have been entered into the scanner 11 (for example, a display screen C2 in FIG. 10) on the touch panel 28 (steps A30 and B20). The transaction controlling unit 14 requests the scanner 11 to obtain picture image of the slip (steps A40 and B30).

When the customer inserts a slip on which predetermined items (name of bank, name of branch/business office, account number, name of transferee and name of transferor in an example of a transfer request form C3 in FIG. 10) have been entered into the scanner 11 of the automatic transaction apparatus 1, the slip recognizing unit 12 determines a type of the slip on the basis of the picture image of the slip (steps A50 and B40). The slip recognizing unit 12 cuts out picture image of each item of the slip (steps A60 and B50).

The character recognizing unit 13 recognizes characters in each item cut out by the slip recognizing unit 12 (steps A70 and B60).

The determination priority control processing unit 16 determines whether correction assistance by an assistant should be performed or not according to predetermined priority (steps A80 and B70).

The automatic transaction apparatus 1 according to this embodiment determines whether correction assistance by an assistant is necessary in the order of (1) transaction date/time, (2) customer information, (3) a character recognition rate of each item, and (4) a character recognition rate of the whole slip. When the customer requests correction assistance by an assistant with the correction assistance direction inputting unit 29, correction assistance by an assistant is performed in preference to these determination conditions.

First, the date/time determination processing unit 21 refers to a clock and a calendar of the automatic transaction apparatus 1 to obtain date and time, compares them with the date/time determination information 26 (steps A90 and A100), and determines whether correction assistance by an assistant should be performed or not (steps A150 and B80).

In concrete, when date or the like when the transaction is carried out does not satisfy any one of the determination conditions set in the date/time determination information 26 (refer to NO route at step A150 and NO route at step B80), the determination priority control processing unit 16 determines whether a determination condition given the next priority exists or not with respect to determination on whether correction assistance by an assistant is necessary (step A160).

When there is another determination condition (refer to YES route at step A160), it is determined whether correction assistance by an assistant should be requested or not with respect to that determination condition.

Namely, the customer information determination processing unit 20 obtains information on the customer who is carrying out the transaction from the customer information 35 of the HOST/business office server 4, compares it with the customer information determination information 25 (steps A110 and A120), and determines whether correction assistance by an assistant should be performed or not (steps A150 and B80).

When the information on the customer who is carrying out the transaction does not satisfy any one of determination conditions set in the customer information determination information 25 (refer to NO route at step A150 and NO route at step B80), the determination priority control processing unit 16 determines whether a determination condition given the next priority exists with respect to determination on whether correction assistance by an assistant is necessary or not (step A160).

When there is another determination condition (refer to YES route at step A160), it is determined whether correction assistance by an assistant should be performed or not with respect to that determination condition.

Namely, the item unit determination processing unit 19 obtains a rate of character recognition on each item on the slip, compares it with the item unit determination information 24 (step A130), and determines whether correction assistance by an assistant should be requested or not (steps A150 and B80).

When a character recognition rate of each item of the slip does not satisfy any one of the determination conditions set in the item unit determination information 24 (refer to NO route at step A150 and NO route at step B80), it is determined whether there is a determination condition given the next priority exists with respect to determination on whether correction assistance by an assistant is necessary or not (step A160).

When there is another determination condition (refer to YES route at step A160), it is determined whether correction assistance by an assistant should be performed or not with respect to that determination condition.

Namely, the slip unit determination processing unit 18 obtains a character recognition rate of the whole slip, compared it with the slip unit determination information 23 (step A140), and determines whether correction assistance by an assistant should be performed or not (steps A150 and B80).

The determination priority control processing unit 16 determines whether a determination condition give the next priority exists with respect to determination on whether correction assistance by an assistant is necessary or not (step A160).

When there is not another determination condition (refer to NO route at step A160), the correction assistance determination processing unit 15 determines that correction assistance by an assistant is unnecessary, and displays a menu for requesting the customer to correct on the touch panel 28 as shown in FIG. 8(*a*) (step A170).

The correction assistance determination processing unit 15 confirms whether the customer makes a request for correction assistance by an assistant with the correction assistance direction inputting unit 29 (step A180). When the customer does not make a request for correction assistance by an assistant with the correction assistance direction inputting unit 29 (refer to NO route at step A180), the transaction controlling unit 14 displays a screen for confirmation on the touch panel 28 as shown in FIG. 8(*a*), then displays a screen for correction to the customer to prompt the customer to correct (step A190).

Afterward, the transaction controlling unit 14 displays a screen for confirmation of contents of the transaction like a display screen C5 (refer to FIG. 12) on the touch panel 28 (steps A260 and B200). When the customer selects "correct" here, the transaction controlling unit 14 again displays a menu for requesting the customer to correct to the customer as shown in FIG. 8(*a*) (step B210). The transaction controlling unit 14 displays a screen for correction to the customer as shown in FIG. 8(*b*) to make the customer correct (step B220), then the procedure proceeds to step B200.

When the customer selects "confirm" to confirm contents of the transaction, the transaction controlling unit 14 transmits the transaction data to the HOST/business office server 4 (steps A270 and B230), then the procedure returns to step A10. Namely, the transaction controlling unit 14 displays a menu to the customer to prompt the customer to select any one of transactions of "withdrawal," "balance inquiry," "money transfer," and "deposit," as shown on a display screen C6 in FIG. 12 (step B240).

When the customer selects a button of "cancel" on the display screen C5 in FIG. 12, the automatic transaction apparatus 1 terminates the transaction, and the procedure returns to step A10.

When the correction assistance determination processing unit 15 determines that correction assistance by an assistant is necessary or when the customer requests correction assistance by an assistant with the correction assistance direction inputting unit 29 (refer to YES route at step A150, YES route at step A180 and YES route at step B80), the correction assistance determination processing unit 15 directs the correction assistance speech apparatus 30 to connect the line in order that the customer can converse with an assistant (steps A200 and B90), calls an assistant at the operator terminal 2, and requests assistance by the assistant (steps A210 and B100).

In response to a call from the automatic transaction apparatus 1, the assistant picks up a receiver (handset) of the correction assistance speech apparatus 31 provided to the operator terminal 2 (step B110), whereby a connection between the correction assistance speech apparatus 30 and the operator terminal 2 is established (step B120). The data transmitting/receiving unit 32 of the operator terminal 2 waits for image data and a result of character recognition on the slip to be transmitted from the automatic transaction apparatus 1 over the public line 5.

The transaction controlling unit 14 hands over image data of the slip obtained by the scanner 11 and a result of character recognition obtained by the character recognizing unit 13 to the data transmitting/receiving unit 27, and requests the transmitting/receiving unit 27 to transmit them to the operator terminal 2 (step B130). The data transmitting/receiving unit 27 transmits these data to the operator terminal 2 (steps A220 and B140).

The data transmitting/receiving unit 32 of the operator terminal 2 waits for the data to be transmitted from the automatic transaction apparatus 1 (step B150). When receiving the data from the automatic transaction apparatus 1, the data transmitting/receiving unit 32 of the operator terminal 2 hands over these data to the data displaying/correcting/adding unit 33. The data displaying/correcting/adding unit 33 arranges and displays the data of each item in two rows, as shown in FIG. 7 (step B160).

When it is set in the customer direction determination processing unit 17 that the customer can direct to refuse correction assistance by the assistant, a message as shown in FIG. 13 is displayed on the touch panel 28 together with a button of "stop." Whereby, the customer can refuse correction assistance by the assistant or can make a result of the correction void if the customer selects "stop."

When a communication with the operator terminal 2 is established, the transaction controlling unit 14 in the automatic transaction apparatus 1 displays a message that conversation with the assistant is possible on the touch panel 28 as shown in a display screen C4 in FIG. 11 (steps S230 and B170).

The assistant corrects data that has been recognized in character recognition or adds lacking information, for example, with the data displaying/correcting/adding unit 33 while confirming it in conversation with the customer over the correction assistance speech apparatus 31 and 30 (step A240).

The automatic transaction apparatus 1 waits for data that has been corrected, for example, to be received from the operator terminal 2 (step B180). The operator terminal 2 transmits the corrected data to the automatic transaction apparatus 1 through the data transmitting/receiving unit 32 (step B190).

The transaction controlling unit 14 receives the data that has been corrected, for example, from the operator terminal 2 (step A250). The procedure proceeds to step A260 (step B200), and a process similar to the above is performed.

The automatic transaction apparatus 1 and the automatic transaction system 50 according to the embodiment of this invention determine whether assistance by an assistant is necessary in the inputting process with a slip on the basis of whether a result of recognition by the character recognizing unit 13 satisfies a predetermined determination condition or not. When a predetermined condition is satisfied, the assistant gives correction assistance. The assistant does not execute the process when assistance by the assistant is unnecessary, so that concentration of a large load on the assistant can be avoided. Further, it is possible to effectively use the assistant.

Even if the number of the automatic transaction apparatus 1 increases, it is possible to avoid concentration of a large load on the assistant. Hence, it is possible to decrease the personnel cost of the assistants or the number of the operator terminals 2, which allows reduction of the cost for maintaining the automatic transaction system 50.

Since the customer information determination processing unit 20 determines whether assistance by an assistant is necessary in the inputting process with a slip on the basis of information on a customer, the customer who needs assistance can receive assistance by an assistant, which leads to improvement of the quality of the service to the customer. When the customer is at an advanced age or in a position that can receive VIP treatment, for example, correction assistance by an assistant is carried out, so that the customer does not need to correct by himself/herself. This raises the degree of satisfaction of the customer.

Date or time are taken in consideration to determine whether assistance by an assistant is necessary or not. It is thereby possible to provide assistance by an assistant according to date or time. Namely, assistance by an assistant is automatically requested and correction assistance by the assistant is carried out in a day or at a time (before 20 o'clock, weekend, the end of month) when the rate of use of the automatic transaction apparatus 1 increases and the office is crowded. Accordingly, it is possible to shorten a time required to correct a result of character recognition, solve a situation in which customers make a long queue in front of the automatic transaction apparatus, relief congestion, and improve the quality of the service to the customers.

It is determined, on the basis of a character recognition rate of a slip, whether assistance by an assistant is necessary in the inputting process with the slip. When the character recognition rate is low, for example, it is determined that assistance by an assistant is necessary. It is thus possible to improve the accuracy of inputted information, the reliability of the system, and the quality of the service to the customers.

It is determined, on the basis of a character recognition rate of a predetermined item of a slip, whether assistance by an assistant is necessary in the inputting process with the slip. When correction by a customer in the inputting process with a slip is relatively complicated, for example, it is determined that assistance by an assistant is necessary, which leads to improvement of the service to the customers.

It is determined, on the basis of a type of transaction, whether assistance by an assistant is necessary in the inputting process with a slip. Even if the character recognition rate is high, assistance by an assistant is requested in the case of a specific type of transaction, for example. It is thereby possible to improve the accuracy of inputted information, and the reliability of the system.

It is determined whether correction assistance by an assistant should be performed on the basis of whether the character recognition rate of a slip obtained by the character recognizing unit 13 satisfies a predetermined correction assistance condition. Additionally, the correction assistance condition is changed according to a kind of slip, that is, a type of transaction. Even if the character recognition rate is relatively low, correction assistance by an assistant is not performed in the case of a specific transaction (a type of slip). Whereby, it is possible to avoid concentration of an excessive load on the assistant even if the number of the automatic transaction apparatus 1 increases, thus the personnel cost of the assistants and the number of the operator terminals 2 can be decreased, and the cost for maintaining the automatic transaction system 50 can be decreased.

Similarly, a condition (a character recognition rate) under which a request for correction assistance by an assistant is made is set according to a type of an item of a slip. Even if the character recognition rate of a specific item is relatively low, correction assistance by an assistant is not performed. It is thus possible to decrease the personnel cost of assistants, the number of the operator terminals 2, and the cost for maintaining the automatic transaction system 50.

For example, a correcting work done with a Japanese kana syllabary keyboard displayed on the touch panel 28 is done by an assistant instead of the customer, whereby the degree of satisfaction of the customer can be increased.

The information changing units 34 in the operator terminal 2, the monitoring apparatus 3 and the HOST/business office server 4 can arbitrarily set correction assistance conditions in the slip unit determination information 23, the item unit determination information 24, the customer information determination information 25 and the date/time determination information 26. Accordingly, it is possible to arbitrarily change these correction assistance conditions according to a load on the assistant or a situation of use of the automatic transaction apparatus 1, which allows effective use of the assistant.

The slip unit determination processing unit 18, the item unit determination processing unit 19, the customer information determination processing unit 20 and the date/time determination processing unit 21 determine, on the basis of two or more determination conditions among conditions of information on a customer, a type of transaction, a character recognition rate of a slip, a character recognition rate of a predetermined item of the slip, date/time, whether assistance by an assistant is necessary or not. Additionally, the determination priority control processing unit 16 sets the order in which two or more determination conditions are applied, so that the order in which these determination conditions are applied is set according to a situation of use of the automatic transaction apparatus 1, for example. This improves the quality of the service to the customers.

The information changing units 34 in the operator terminal 2, the monitoring apparatus 3, the HOST/business office server 4 change predetermined determination conditions (slip unit determination information 23, item unit determination information 24, customer information determination information 25, date/time determination information 26), whereby a level at which a request for assistance by an assistant is made can be changed according to a situation of use of the automatic transaction apparatus 1, a load on the assistant, etc. This can avoid an excessive load on the assistant, and allow effective use of the assistant.

Note that the present invention is not limited to the above example, but may be modified in various ways without departing from the scope of the invention.

In the above embodiment, the determination priority information 22, the slip unit determination information 23, the item unit determination information 24, the customer information determination information 25 and the date/time determination information 26 are stored in the storage unit of the automatic transaction apparatus 1. However, this is not limited to the above example. They can be stored in, for example, the monitoring apparatus 3, the HOST/business office server 4 or the operator terminal 2 other than the automatic transaction apparatus 1.

The above embodiment has been described by way of example where the present invention is applied to a bank operation (particularly, money transfer) However, this invention is not limited to this. The present invention can be applied in various transactions such as a transaction carried out by reading a slip entered by a customer by a scanner, a transaction relating to various securities, a transaction relating to loan business, and a transaction relating to issue of tickets, passes or the like in the similar manner to the above, and can provide functions and effects similar to those provided in the above embodiment.

In the above embodiment, the determination priority control processing unit 16 sets the order of priority in which determinations by the slip unit determination processing unit 18, the item unit determination processing unit 19, the customer information determination processing unit 20 and the date/time determination processing unit 21 should be applied. However, this invention is not limited to the above example, but it is possible to eliminate application of any one of determinations by the slip unit determination processing unit 18, the item unit determination processing unit 19, the customer information determination unit 20 and the date/time determination processing unit 21.

The present invention may be practiced by a person skilled in the art so long as the embodiment of this invention is disclosed.

INDUSTRIAL APPLICABILITY

The automatic transaction apparatus and the automatic transaction system according to this invention are useful in an automatic transaction system having a function of correcting an inputting process with a slip, suited to an automatic transaction apparatus used in a banking institution, for example.

The invention claimed is:

1. A slip processing apparatus provided by a first financial institution, comprising:
   a slip image obtaining unit obtaining image information on a slip on which character information has been entered by a customer regarding a current transaction;
   a character recognizing unit recognizing characters entered on said slip based on said image information obtained by said slip image obtaining unit;
   a slip recognizing unit recognizing the current transaction on said slip directs the first financial institution or a second financial institution different from the first financial institution based on said image information obtained by said slip image obtaining unit;
   a slip information unit storing a predetermined determination condition corresponding to the type of said slip recognized by said slip recognizing unit which condition sets a first character recognition rate required for a transaction with the first financial institution and a second character recognition rate required for a transaction with the second financial institution, the second character recognition rate being higher than the first character recognition rate;
   a determining unit obtaining a time or a date when said slip image obtaining unit has obtained the image information, and determining whether the customer requires assistance, by an assistant, with the current transaction, based on the predetermined determination condition and based on the obtained time or date; and
   an assistance requesting unit requesting assistance by said assistant when said determining unit determines that assistance by said assistant is necessary.

2. The slip processing apparatus according to claim 1 wherein said predetermined determination condition is based on information within a customer information record.

3. The slip processing apparatus according to claim 1, wherein said predetermined determination condition is a character recognition rate of said slip.

4. The slip processing apparatus according to claim 3, wherein said character recognizing unit performs character recognition on each of items on said slip, and said predetermined determination condition is a character recognition rate of a predetermined item of said slip.

5. The slip processing apparatus according to claim 3, wherein said predetermined determination condition is a type of the current transaction.

6. The slip processing apparatus according to claim 1, wherein said determining unit determines whether assistance by said assistant is necessary on the basis of two or more determination conditions among conditions of information on a customer, a type of the current transaction, a character recognition rate of said slip, a character recognition rate of a predetermined item of said slip, and date and time; and
    said determining unit comprises an order setting unit setting the order in which said two or more determination conditions are to be applied.

7. A slip processing system provided by a first financial institution, comprising:
    a slip image obtaining unit obtaining image information on a slip on which character information has been entered by a customer regarding a current transaction;
    a character recognizing unit recognizing characters entered on said slip based on said image information obtained by said slip image obtaining unit;
    a slip recognizing unit recognizing the current transaction on said slip directs the first financial institution or a second financial institution different from the first financial institution based on said image information obtained by said slip image obtaining unit;
    a slip information unit storing a predetermined determination condition corresponding to the type of said slip recognized by said slip recognizing unit which condition sets a first character recognition rate required for a transaction with the first financial institution and a second character recognition rate required for a transaction with the second financial institution, the second character recognition rate being higher than the first character recognition rate;
    a determining unit obtaining a time or date when said slip image obtaining unit has obtained the image information, and determining whether the customer requires assistance, by an assistant, with the current transaction, based on the predetermined determination condition and based on the obtained time or date;
    an assistance requesting unit requesting assistance by said assistant when said determining unit determines that assistance by said assistant is necessary; and
    an operator terminal comprising an input assisting unit for assisting by said assistant in said inputting process with said slip.

8. The slip processing system according to claim 7, wherein said predetermined determination condition is based on information within a customer information record.

9. The slip processing system according to claim 7, wherein said predetermined determination condition is a character recognition rate of said slip.

10. The slip processing system according to claim 9, wherein said character recognizing unit performs character recognition on each items on said slip, and said predetermined determination condition is a character recognition rate of a predetermined item of said slip.

11. The slip processing system according to claim 7, wherein said predetermined determination condition is a type of the current transaction.

12. The slip processing system according to claim 7, wherein said determining unit determines whether assistance by said assistant is necessary on the basis of two or more determination conditions among conditions of information on a customer, a type of the current transaction, a character recognition rate of said slip, a character recognition rate of a predetermined item of said slip, and date and time; and
    said determining unit comprises an order setting unit for setting the order in which said two or more determination conditions are to be applied.

13. The slip processing system according to claim 7, wherein said operator terminal comprises a determination condition changing unit for changing said predetermined determination condition.

14. The slip processing system according to claim 7 further comprising a monitoring apparatus for monitoring processes by said slip processing apparatus.

15. The slip processing system according to claim 14, wherein said monitoring apparatus comprises a determination condition changing unit for changing predetermined determination condition.

16. The slip processing system according to claim 7 further comprising a management terminal having information on customers.

* * * * *

UNITED STATES PATENT AND TRADEMARK OFFICE
CERTIFICATE OF CORRECTION

| | | |
|---|---|---|
| PATENT NO. | : 7,756,791 B2 | Page 1 of 1 |
| APPLICATION NO. | : 10/449000 | |
| DATED | : July 13, 2010 | |
| INVENTOR(S) | : Hideyuki Takahashi | |

It is certified that error appears in the above-identified patent and that said Letters Patent is hereby corrected as shown below:

Column 1, Line 3 please insert --This application is a continuing application, filed under 35 U.S.C. S111 (a), of International Application PCT/JP00/08708, filed December 8, 2000.--.

Signed and Sealed this
Twelfth Day of June, 2012

David J. Kappos
*Director of the United States Patent and Trademark Office*